United States Patent
Tigli et al.

(10) Patent No.: US 10,423,590 B2
(45) Date of Patent: Sep. 24, 2019

(54) SYSTEM AND METHOD OF MANAGING DATA IN A DISTRIBUTED COMPUTING ENVIRONMENT

(71) Applicant: Bank of America Corporation, Charlotte, NC (US)

(72) Inventors: A. Ugur Tigli, Jersey City, NJ (US); James McCormack, Charlotte, NC (US); Rick A. Beye, Highland Beach, FL (US); Monika Kapur, Jacksonville, FL (US); Konstantin Shushkovsky, Brooklyn, NY (US)

(73) Assignee: Bank of America Corporation, Charlotte, NC (US)

( * ) Notice: Subject to any disclaimer, the term of this patent is extended or adjusted under 35 U.S.C. 154(b) by 328 days.

(21) Appl. No.: 15/631,854

(22) Filed: Jun. 23, 2017

(65) Prior Publication Data
US 2018/0373739 A1    Dec. 27, 2018

(51) Int. Cl.
| | |
|---|---|
| *G06F 15/16* | (2006.01) |
| *G06F 16/21* | (2019.01) |
| *G06F 16/27* | (2019.01) |
| *G06F 16/25* | (2019.01) |
| *G06F 16/178* | (2019.01) |
| *H04L 29/08* | (2006.01) |

(52) U.S. Cl.
CPC .......... *G06F 16/211* (2019.01); *G06F 16/178* (2019.01); *G06F 16/25* (2019.01); *G06F 16/27* (2019.01); *H04L 67/10* (2013.01)

(58) Field of Classification Search
CPC ........ G06F 16/211; G06F 16/27; G06F 16/25; G06F 16/178; H04L 67/10
See application file for complete search history.

(56) References Cited

U.S. PATENT DOCUMENTS

| | | | |
|---|---|---|---|
| 7,844,522 B2* | 11/2010 | Fong | G06Q 40/02 705/35 |
| 8,285,681 B2 | 10/2012 | Prahlad et al. | |
| 8,527,549 B2 | 9/2013 | Cidon | |
| 8,751,399 B2* | 6/2014 | Kolhatkar | G06Q 20/02 705/35 |
| 8,762,642 B2 | 6/2014 | Bates et al. | |

(Continued)

OTHER PUBLICATIONS

Cloud Computing News, "Metadata, Scanning and Security in the Cloud," written by Franz Freidrich Liebinger Portela (14 pgs.), Aug. 19, 2013.

(Continued)

*Primary Examiner* — Moustafa M Meky
(74) *Attorney, Agent, or Firm* — Michael A. Springs

(57) ABSTRACT

In one or more embodiments, one or more systems, processes, and/or methods may receive a first data stream and determine a pattern from the first data stream. At least one rule set based at least on the pattern may be determined. A second data stream, different from the first data stream may be received and entities may be determined, where each of the entities may be associated with respective data of the second data stream that satisfies the at least one rule set. At least one data object of the second data stream may be tagged, in response to determining the entities. In one or more embodiments, tagging the at least one data object may associate the at least one data object with at least one of the entities.

20 Claims, 8 Drawing Sheets

(56) References Cited

U.S. PATENT DOCUMENTS

| | | | |
|---|---|---|---|
| 8,788,628 B1 | 7/2014 | Taylor et al. | |
| 8,805,951 B1 | 8/2014 | Faibish et al. | |
| 8,805,968 B2 | 8/2014 | Taylor et al. | |
| 8,832,820 B2 | 9/2014 | Barjatiya et al. | |
| 8,850,130 B1 | 9/2014 | Aron et al. | |
| 9,147,195 B2 | 9/2015 | Sivaramakrishnan et al. | |
| 9,256,374 B1 | 2/2016 | Aron et al. | |
| 9,398,087 B1 | 7/2016 | Hosie et al. | |
| 9,424,437 B1 | 8/2016 | Ancin et al. | |
| 9,454,398 B2 | 9/2016 | Hacker | |
| 9,565,200 B2 | 2/2017 | Bacastow et al. | |
| 9,953,321 B2 * | 4/2018 | Zoldi | G06Q 20/4016 |
| 10,102,530 B2 * | 10/2018 | Zoldi | G06Q 20/4016 |
| 2008/0046334 A1 * | 2/2008 | Lee | G06Q 20/04 |
| | | | 705/318 |
| 2013/0018796 A1 * | 1/2013 | Kolhatkar | G06Q 20/02 |
| | | | 705/44 |
| 2014/0122325 A1 * | 5/2014 | Zoldi | G06Q 20/4016 |
| | | | 705/39 |
| 2016/0048937 A1 * | 2/2016 | Mathura | G06Q 40/12 |
| | | | 705/30 |
| 2016/0210491 A9 * | 7/2016 | Rosenblatt | G06Q 20/1085 |
| 2017/0017887 A1 * | 1/2017 | Waradkar | G06Q 20/4016 |
| 2017/0039218 A1 | 2/2017 | Prahlad et al. | |
| 2017/0255753 A1 * | 9/2017 | Jarrett | G06N 5/04 |
| 2018/0293501 A1 * | 10/2018 | Ambati | G06N 5/02 |
| 2019/0182233 A1 * | 6/2019 | Hockey | H04L 63/0807 |

OTHER PUBLICATIONS

"Architectures and Protocols for Secure Information Technology Infrastructures," by Antonio Ruiz Martinez et al., Security and Privacy Issues in Cloud Computing, p. 27, © 2014 by IGI Global.

* cited by examiner

SYSTEM AND METHOD OF MANAGING DATA IN A DISTRIBUTED COMPUTING ENVIRONMENT

TECHNICAL FIELD

Certain embodiments of this disclosure relate generally to analyzing and correlating data.

BACKGROUND

Networks allow users to access various types of computing resources, which may include hardware resources and/or software resources. Examples of hardware resources include computer networks, servers, memory, and so on. Examples of software resources include applications, services, data, and so on. The computing resources may be used to process transactions. Data stores and databases can support various data types including traditional file, video, images, etc. within a name space leading to new opportunities and innovations. These data stores can have virtually unlimited storage capacity with extremely high durability and availability along with low costs leading to widespread adoption. Cataloging and maintaining authorized data classification rules and element tagging to support legal holds, eDiscovery, records retention requires intense manual effort and analysis that is prone to errors leading to potential sanctions and fines.

SUMMARY

One or more embodiments of the present disclosure may provide one or more technical advantages. As an example, a technical advantage of one or more embodiments may include receiving a first data stream and determining a pattern, from the first data stream, which may be utilized to determine at least one rule set based at least on the pattern. Other advantages may be apparent to those of ordinary skill in the art. In one or more embodiments, one or more systems, processes, and/or methods may receive a second data stream, different from the first data stream and determine entities, each of entities associated with respective data of the second data stream that satisfies the at least one rule set. In one or more embodiments, at least one data object of the second data stream may be tagged in response to determining the entities.

In one or more embodiments, one or more systems, processes, and/or methods may further provide an alert in response to determining the entities. For example, the at least one data object may include information associated with at least one action that satisfies the at least one rule set. For instance, the at least one action may indicate at least one money laundering action, and an alert may be provided in response to determining the at least one action which indicates the at least one money laundering action. In one or more embodiments, tagging the at least one data object may flag the at least one data object with a legal hold.

In one or more embodiments, one or more systems, processes, and/or methods may store first data objects via a database graph. For example, a query that indicates a selection of data elements and a confidence interval may be received, and the database graph may be searched based at least on the selection of data elements and the confidence interval. For instance, the one or more systems, processes, and/or methods may respond to the query with second data objects that are associated with the selection of data elements and the confidence interval.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
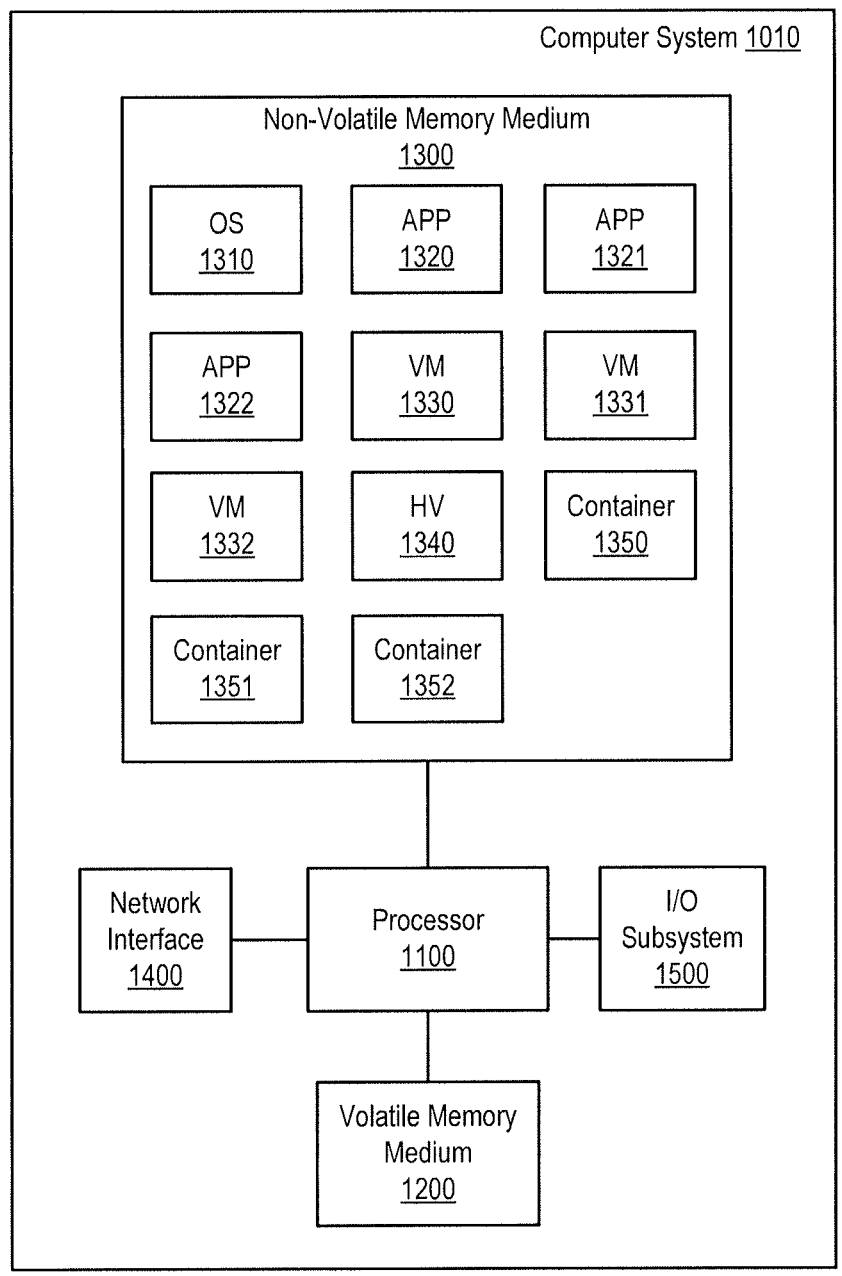
FIG. 1 illustrates an example of a computer system, according to one or more embodiments.

In the following description, details are set forth by way of example to facilitate discussion of the disclosed subject matter. It should be apparent to a person of ordinary skill in the field, however, that the disclosed embodiments are for purposes of example and are not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, one or more systems, processes, and/or methods may utilize one or more machine learning systems, processes, and/or methods that may maintain and track data relationships over time. For example, the one or more machine learning systems, processes, and/or methods may determine measures representing a strength of a relationship between or among data files and may build a graph of data objects (e.g., emails, files, videos, images, banking transactions, records, etc.) that include characteristics and/or relationships.

In one or more embodiments, seed data may be classified and/or tagged, based on one or more classifications, and may be provided to the one or more machine learning systems, processes, and/or methods. For example, the one or more machine learning systems, processes, and/or methods may utilize the seed data and tags of the seed data within a graph system to determine additional relationships between or among elements and/or to extend a data graph (e.g., a database) by constructing new tag attributes to capture the additional relationships. For instance, in enabling and/or implementing an enforcement of an eDiscovery (e.g., electronic discover in a litigation, electronic discover in court proceeding, etc.) hold, a specific e-mail object may be identified as related to eDiscovery and an analysis of a graph and/or tags may produce a map of related data objects with a correlation to the e-mail object.

In one or more embodiments, one or more data objects that are subject to a "hold" (e.g., an eDiscovery hold, a legal hold, etc.) may be flagged. In one example, flagging the one or more data objects that are subject to the "hold" may prevent modification and/or deletion of the one or more data objects that are subject to the "hold".

In one or more embodiments, the one or more machine learning systems, processes, and/or methods may statistically measure a strength of an affinity between or among data objects, which may allow and/or may permit one or more results to be specified within one or more confidence intervals. For example, one or more static classification rules and/or tags may be replaced with one or more dynamic correlation scores. For instance, the one or more machine learning systems, processes, and/or methods may be initiated with known related elements, and the one or more machine learning systems, processes, and/or methods may derive additional related data based on one or more correlations and/or one or more stochastics.

In one or more embodiments, relationship discovery may be dynamic and/or may be able to captures evolving one or more relationships between or among data as the data is utilized by one or more systems, processes, and/or methods. For example, the data may be utilized by one or more systems, processes, and/or methods of a cloud computing infrastructure and/or environment. In this fashion, the one or more machine learning systems, processes, and/or methods may provide one or more means to place attributes and/or tags on data objects to prevent alteracation and destruction of the data object and/or to enforce legal "hold" and one or more archival requirements, according to one or more embodiments.

In one or more embodiments, a client may initiate a processes by selecting data elements and providing a confidence interval requirement as inputs for a query against a database graph. For example, an object data store may be utilized as a data storage to store files, which may store the data elements. In one or more embodiments, standard static data tagging attributes may be tracked in the data graph as the files are provided to the object data store. For example, a database may be utilized to store one or more of meta data, static tagging, and additional dynamic tagging attributes generated by one or more machine learning systems, processes, and/or methods. For instance, the one or more machine learning systems, processes, and/or methods may periodically correlate data objects, calculate one or more affinity scores, and/or store one or more correlations of the data objects and/or affinity scores via the database.

In one or more embodiments, one or more reports may be generated. For example, the one or more reports may include the one or more correlations of the data objects and/or affinity scores. For instance, the one or more reports may specify one or more data objects as related to and/or subject to a "hold" (e.g., a legal "hold") action. In one or more embodiments, data may be extracted for further analysis and/or validation.

Turning now to FIG. 1, an example of a computer system is illustrated, according to one or more embodiments. As shown, a computer system 1010 may include a processor 1100, a volatile memory medium 1200, a non-volatile memory medium 1300, a network interface 1400, and an input/output (I/O) subsystem 1500. As illustrated, volatile memory medium 1200, non-volatile memory medium 1300, network interface 1400, and I/O subsystem 1500 may be communicatively coupled to processor 1100.

As shown, non-volatile memory medium 1300 may include an operating system (OS) 1310, applications (APPs) 1320-1322, virtual machines (VMs) 1330-1332, a hypervisor (HV) 1340, and containers 1350-1352. In one or more embodiments, one or more of OS 1310, APPs 1320-1322, VMs 1330-1332, HV 1340, and containers 1350-1352 may include instructions executable by processor 1100. In one example, processor 1100 may execute instructions of one or more of OS 1310, APPs 1320-1322, VMs 1330-1332, HV 1340, and containers 1350-1352 via non-volatile memory medium 1300. In another example, one or more portions of the instructions of the one or more of OS 1310, APPs 1320-1332, VMs 1330-1332, HV 1340, and containers 1350-1352 may be transferred to volatile memory medium 1200, and processor 1100 may execute the one or more portions of the instructions of the one or more of OS 1310, APPs 1320-1332, VMs 1330-1332, HV 1340, and containers 1350-1352 via volatile memory medium 1200.

In one or more embodiments, HV 1340 may include one or more of software, firmware, and hardware that creates and executes one or more VMs (e.g., one or more of VMs 1330-1332). For example, computer system 1010 may be considered host machine when HV 1340 executes and one or more of VMs 1330-1332 are executed via HV 1340. For instance, a virtual machine (VM) (e.g., a VM of VMs 1330-1332) may be considered a guest machine. In one or more embodiments, a VM may provide one or more structures and/or functionalities as those described with reference to computer system 1010 (e.g., singularly or via nesting of hypervisors and virtual machines). In one example, the VM may provide emulated devices to a guest OS that executes via the VM. In another example, the VM may provide hardware devices to the guest OS that executes via the VM. In one instance, the guest OS may access hardware in a pass-through configuration. In another instance, the guest OS may access hardware in a single root input/output virtualization (SR-IOV) configuration. In one or more embodiments, guest operating systems may share one or more devices of a host machine. For example, the guest operating systems may share one or more of a network adapter via virtual network adapters and a storage device via a virtual storage devices (e.g., virtual disks, virtual memory, etc.), among others.

In one or more embodiments, OS level virtualization may be utilized. For example, OS level virtualization may include a kernel of an OS that permits multiple isolated user space instances of collections of processes (e.g., programs, applications, services, etc.). For instance, these instances are often referred to as "containers", "software containers", "virtualization engines", or "jails" (e.g., FreeBSD jails, chroot jails, etc.). In one or more embodiments, with OS level virtualization, an OS may behave and/or may appear like multiple different, individual computer systems. For example, little to no overhead may be imposed by OS level virtualization, as processes in OS level virtual partitions may utilize a single system call interface of an OS. For instance, OS level virtual partitions may not be subjected to emulation or be executed via virtual machines. In one or more embodiments, OS level virtualization may be utilized in consolidating computer system hardware or virtual machines by moving services on separate hosts or virtual machines into containers on a computer system or single virtual machine.

In one or more embodiments, a container may be or include software in a file system that includes one or more of instructions executable by a processor (e.g., a program, software, an application, server software, a service, etc.), one or more runtime libraries, one or more system tools, and one or more system libraries, among others. For example, a container may be or include a Docker container, a LXC, or a Kubernetes pod, among others. In one or more embodiments, a container may provide and/or may implement operating system-level virtualization via a virtual environment that includes a separate process space and/or a separate network space, rather than creating and/or implementing a virtual machine.

In one or more embodiments, a container may be or include a pod (e.g., a Kubernetes pod). For example, a pod may provide and/or add a higher level of abstraction to one or more containerized elements. For instance, a pod may include one or more containers that may be warranted to be co-located and/or executed on a computer system (e.g., a host computer system, host machine, etc.) and may share resources of the computer system. In one or more embodiments, a thick container may be or include a pod, and a thin container may include a single container.

In one or more embodiments, containers may provide and/or offer an immutable quality and/or option. For example, a container may be deployed, destroyed, modified, re-constructed and/or re-created, and re-deployed. In one instance, instructions, executable by a processor, of a container may not be modified while the container is executing. In another instance, instructions, executable by a processor, of a container may not be modified once the container is created.

In one or more embodiments, the term "memory medium" may mean a "memory device", a "memory", a "storage device", a "tangible computer readable storage medium", and/or a "computer-readable medium". In one example, a memory medium may be a volatile memory medium. For instance, the volatile memory medium may lose stored data when the volatile memory medium no longer receives power. In a second example, a memory medium may be a non-volatile memory medium. For instance, the non-volatile memory medium may not lose stored data when the volatile memory medium no longer receives power or when power is not applied. In another example, a memory medium may include a volatile memory medium and a non-volatile memory medium.

In one or more embodiments, a volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others.

In one or more embodiments, I/O subsystem 1500 may include or represent a variety of communication interfaces, graphics interfaces, video interfaces, user input interfaces, and/or peripheral interfaces, among others. For example, I/O subsystem 1500 may include one or more of a touch screen, a display, a display adapter, and a universal serial bus (USB) interface, among others. For instance, a touch screen may include circuitry that enables touch functionality in conjunction with a display that is driven by a display adapter.

In one or more embodiments, network interface 1400 may be configured to be coupled to a network. For example, network interface 1400 may permit computer system 1010 to be communicatively coupled to a network. In one instance, network interface 1400 may be configured to be coupled to a wired network. In a second instance, network interface 1400 may be configured to be coupled to a wireless network. In a second instance, network interface 1400 may be configured to be coupled to an optical network.

In one or more embodiments, one or more of volatile memory medium 1200, non-volatile memory medium 1300, network interface 1400, and I/O subsystem 1500 may be communicatively coupled to processor 1100 via one or more buses. For example, a bus may include one or more of a peripheral component interconnect (PCI) bus, a serial peripheral interface (SPI) bus, an inter-integrated circuit ($I^2C$) bus, an enhanced serial peripheral interface (eSPI) bus, a system management bus (SMBus), a universal serial bus, and a low pin count (LPC) bus, among others. In one or more embodiments, one or more of volatile memory medium 1200, non-volatile memory medium 1300, network interface 1400, and I/O subsystem 1500 may be communicatively coupled to processor 1100 via one or more of a PCI-Express (PCIe) root complex and one or more PCIe switches, among others.

In one or more embodiments, processor 1100 may execute instructions in implementing one or more systems, flowcharts, methods, and/or processes described herein. In one example, processor 1100 may execute processor instructions from one or more of memory media 1200 and 1300 in implementing one or more systems, flowcharts, methods, and/or processes described herein. In another example, processor 1100 may execute instructions received via network interface 1400 in implementing one or more systems, flowcharts, methods, and/or processes described herein.

In one or more embodiments, processor 1100 may include circuitry that may interpret and/or execute program instructions and/or process data, among others. For example, processor 1100 may include one or more of a system, a device, and an apparatus that may interpret and/or execute program instructions and/or process data, among others. For instance, processor 1100 may include one or more of a central processing unit (CPU), a microprocessor, a graphics processing unit (GPU), an application processor, a digital signal processor (DSP), and an application specific integrated circuit (ASIC), among others.

Figure 2:
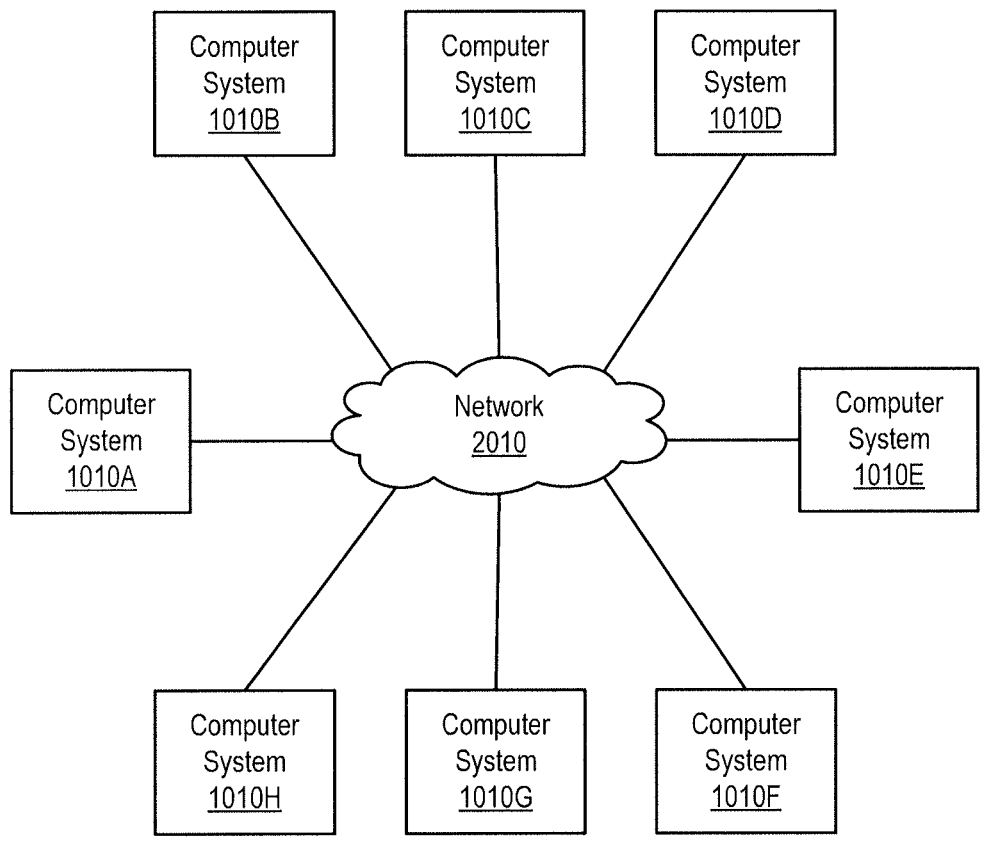
FIG. 2 illustrates an example of computer systems coupled to a network, according to one or more embodiments.

Turning now to FIG. 2, computer systems coupled to a network are illustrated, according to one or more embodiments. As shown, computer systems 1010A-1010H may be communicatively coupled to a network 2010. In one or more embodiments, network 2010 may include one or more of a wired network, an optical network, and a wireless network. For example, network 2010 may include one or more of a local area network (LAN), a wide area network (WAN), a wireless LAN (WLAN), a metropolitan area network (MAN), a public switched telephone network (PSTN), a public WAN (e.g., an Internet), a private WAN, a cellular telephone network, a satellite telephone network, and a virtual private network (VPN), among others. In one or more embodiments, network 2010 may be coupled to one or more other networks. For example, network 2010 may be coupled to one or more of a LAN, a WAN, a WLAN, a MAN, a PSTN, a public WAN, a private WAN, a cellular telephone network, a satellite telephone network, and a VPN, among others.

Figure 3:
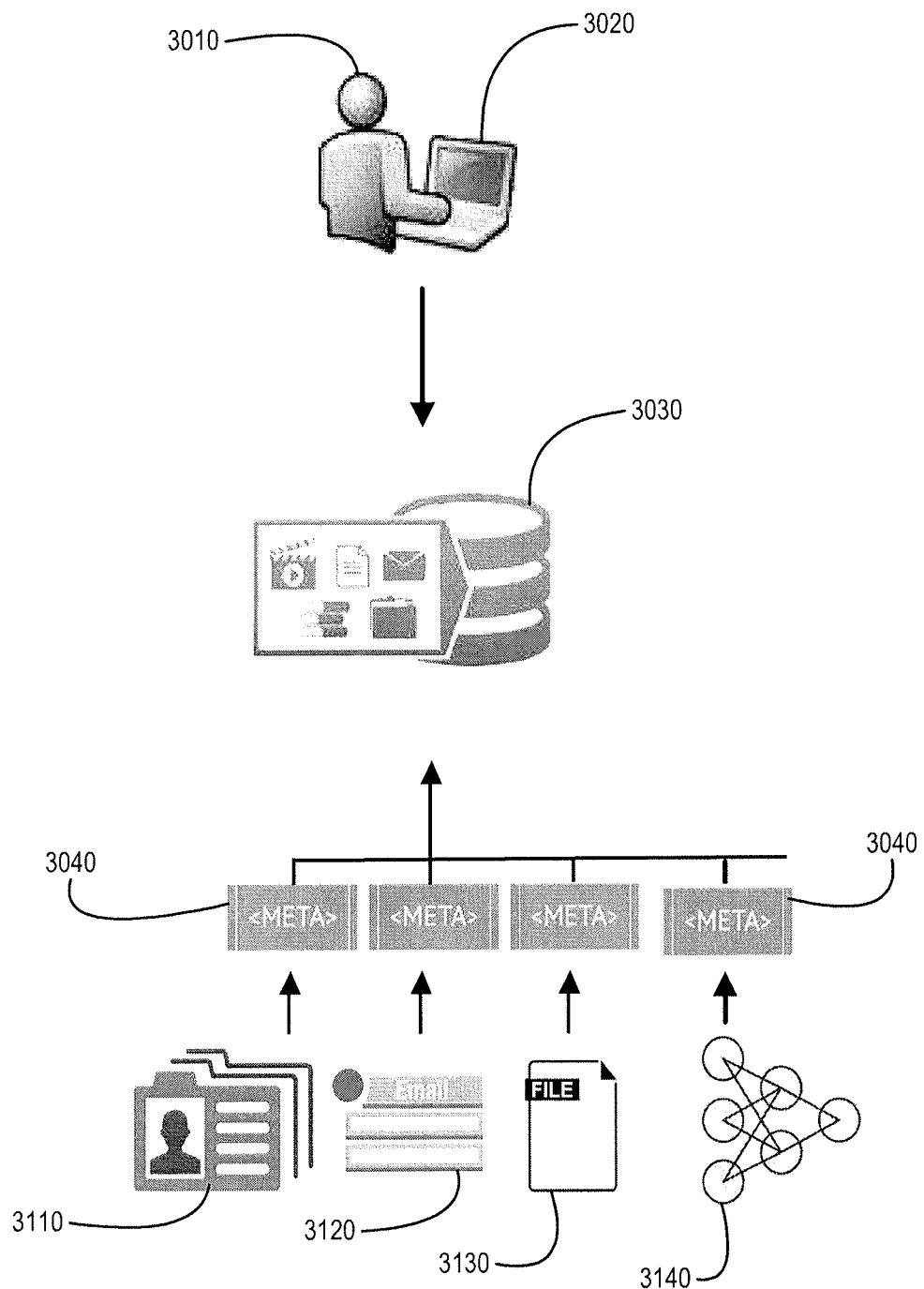
FIG. 3 illustrates an example of a legal hold or eDiscovery request to identify and hold data related to an action, according to one or more embodiments.

Turning now to FIG. 3, an example of a legal hold or eDiscovery request to identify and hold data related to an action is illustrated, according to one or more embodiments. In one or more embodiments, a user 3010 may utilize a client computer system 3020 to initiate one or more processes by selecting data elements and providing a confidence interval requirement as inputs to one or more queries of a database 3030. For example, database 3030 may include a database graph, and client computer system 3020 may initiate one or more process by selecting data elements and providing a confidence interval requirement as inputs to one or more queries of the database graph of database 3030. In one or more embodiments, database 3030 may include an object data store that may be utilized as enterprise data storage to store files that are part of one or more systems described herein. In one or more embodiments, database 3030 may include and/or be implemented via one or more of computer systems 1010A-1010H, among others.

In one or more embodiments, database 3030 may include a "not only SQL" (NoSQL) database. For example, the NoSQL database may store metadata 3040, static tagging, and/or additional dynamic tagging attributes generated by one or more systems, methods, and/or processes described herein. In one instance, meta data 3040 may be generated from directories (e.g., folders) 3110, emails 3120, and/or files 3130, among others. In another instance, metadata 3040 may be generated via one or more machine learning systems, processes, and/or methods that may correlate data objects and/or determine affinity scores. For example, metadata 3040 may be generated via an artificial intelligence (AI) engine 3140 that may correlate data objects and/or determine affinity scores.

In one or more embodiments, the correlated data objects and/or determined affinity scores may be stored via database 3030. For example, the correlated data objects and/or determined affinity scores may be stored via the NoSQL database. In one or more embodiments, one or more reports may be generated to specify data objects identified as related to and/or subject to a legal "hold". For example, the one or more reports may be displayed and/or provided to user 3010 via client computer system 3020. In one or more embodiments, data may be extracted from database 3030 for further analysis and/or validation.

Figure 4A:
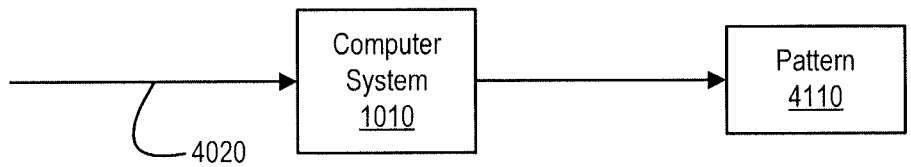
FIG. 4A illustrates an example of a computer system determining a pattern from a first data stream, according to one or more embodiments.

Turning now to FIG. 4A, an example of a computer system determining a pattern from a first data stream is illustrated, according to one or more embodiments. As shown, computer system 1010 may receive a data stream 4020. In one or more embodiments, computer system may analyze data stream 4020 and produce a pattern 4110, based at least on an analysis of data stream 4020. In one example, pattern 4110 may be or include a pattern of use. In a second example, pattern 4110 may be or include a pattern of words that indicates at least one intent. In another example, pattern 4110 may be or include a pattern of shopping for one or more large appliances (e.g., a refrigerator, a clothes washing machine, a cloths drying machine, etc.). For instance, shopping for one or more large appliances may indicate an intent (e.g., an intent to purchase a house, an intent to purchase a condominium, etc.).

In one or more embodiments, data stream 4020 may be or include seed data, which may be classified and/or tagged, based on one or more classifications, and may be provided to the one or more machine learning systems, processes, and/or methods. For example, computer system 1010 may include the one or more machine learning systems, processes, and/or methods, which may utilize the seed data and tags of the seed data within a graph system to determine additional relationships between or among elements and/or to extend a data graph (e.g., a database) by constructing new tag attributes to capture the additional relationships. For instance, in enabling and/or implementing an enforcement of an eDiscovery hold, a specific e-mail object may be identified as related to eDiscovery and an analysis of a graph and tags may produce a map of related data objects with a correlation to the e-mail object.

Figure 4B:
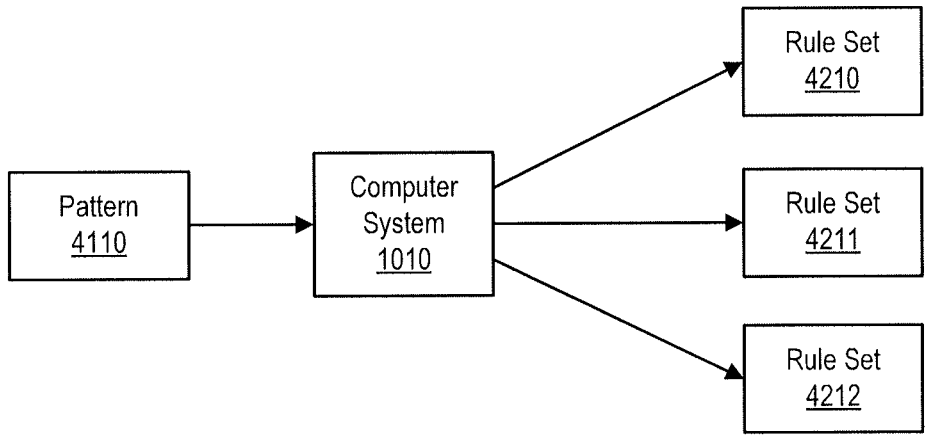
FIG. 4B illustrates an example of a computer system determining one or more rule sets from a pattern, according to one or more embodiments.

Turning now to FIG. 4B, an example of a computer system determining one or more rule sets from a pattern is illustrated, according to one or more embodiments. As shown, computer system 1010 may receive pattern 4110. In one or more embodiments, computer system 1010 may produce one or more of rule sets 4210-4212 based at least on pattern 4110. For example, at least one of rule sets 4210-4212 may include at least one action that satisfies the at least one of rule sets 4210-4212.

Figure 4C:
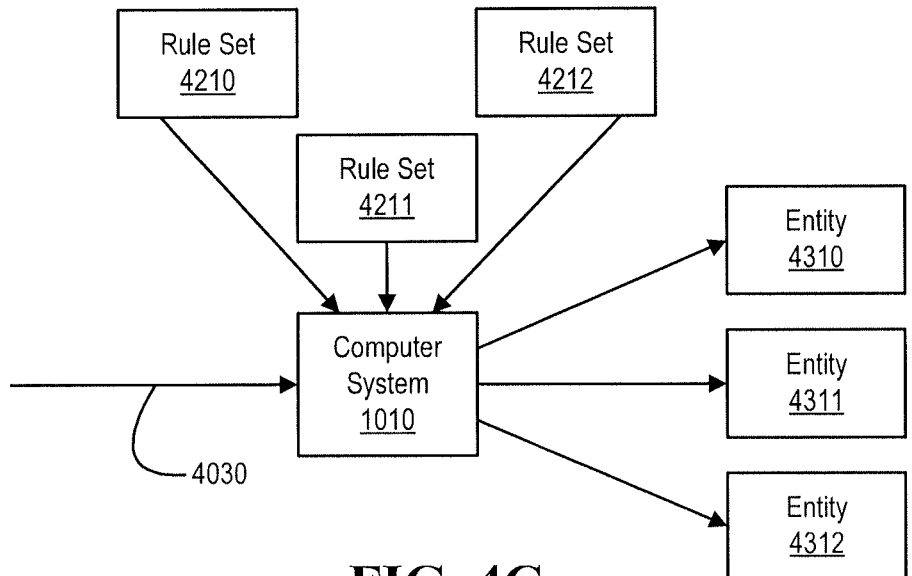
FIG. 4C illustrates an example of a computer system determining one or more entities from a second data stream based on one or more rule sets, according to one or more embodiments.

Turning now to FIG. 4C, an example of a computer system determining one or more entities from a second data stream based on one or more rule sets is illustrated, according to one or more embodiments. As shown, computer system 1010 may receive a data stream 4030 and determine one or more entities 4310-312. For example, data of data stream 4030 may be regressed to determine one or more entities 4310-312. For instance, one or more entities 4310-312 may indicate one or more intents (e.g., intents of one or more persons).

In one or more embodiments, determining the one or more entities 4310-312 may be based at least on one or more of rule sets 4210-212. In one or more embodiments, an alert may be provided and/or generated in response to determining at least one of the one or more entities 4310-312. In one or more embodiments, determining at least one of the one or more entities 4310-312 may be based at least on data of data stream 4030 not satisfying one or more of rule sets 4210-212. For example, determining at least one of the one or more entities 4310-312 based at least on data of data stream not satisfying one or more of rule sets 4210-212 may determine and/or indicate non-normal activity. For instance, the non-normal activity may indicate suspicious activity. In one or more embodiments, at least one of the one or more entities 4310-312 based at least on data of data stream 4030 not satisfying one or more of rule sets 4210-212 may be utilized by one or more machine learning systems, processes, and/or methods to determine and/or develop new rules that were not originally postulated.

Figure 4D:
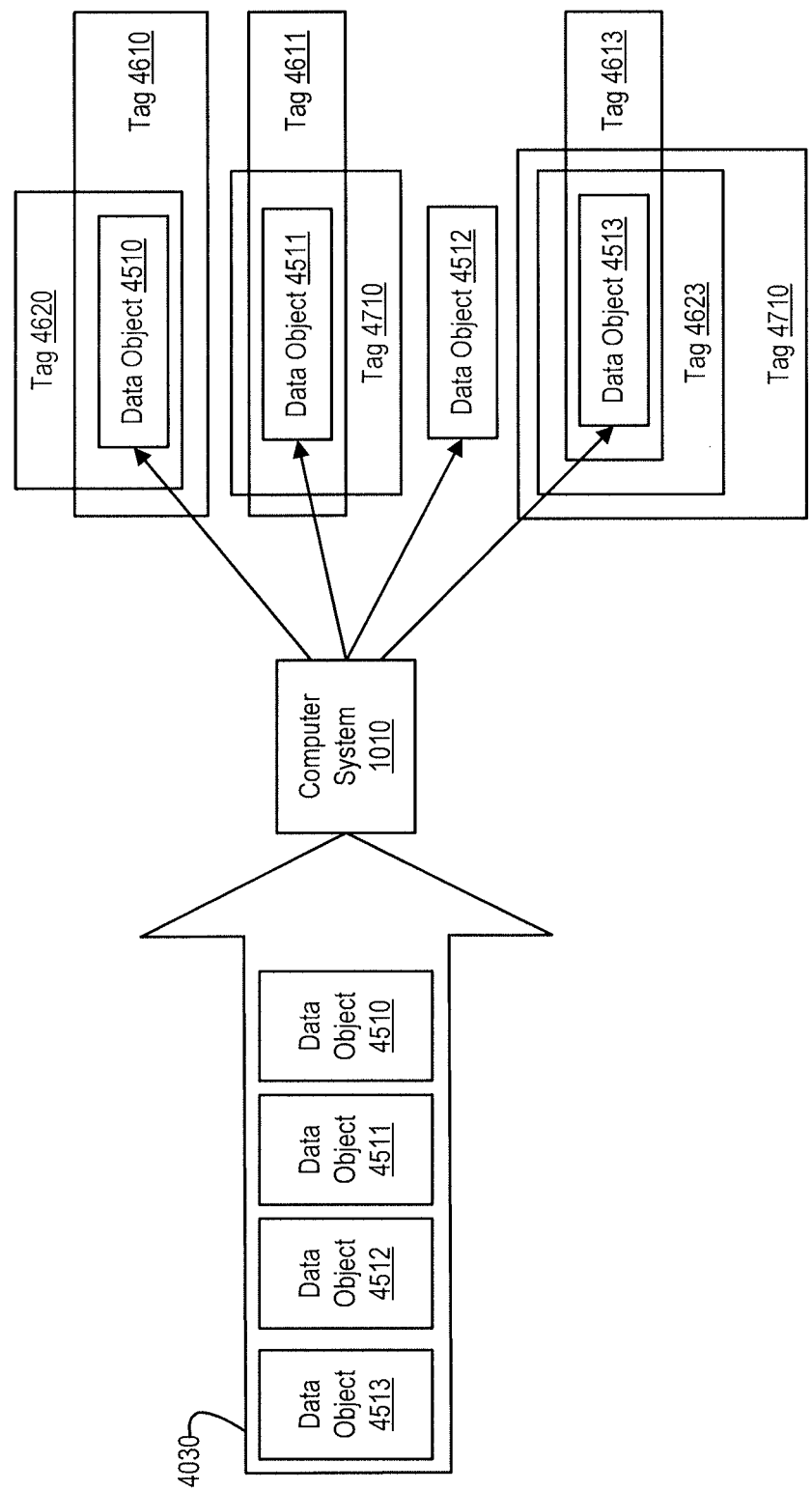
FIG. 4D illustrates an example of a computer system tagging one or more data objects of the second data stream, according to one or more embodiments.

Turning now to FIG. 4D, an example of a computer system tagging one or more data objects of the second data stream is illustrated, according to one or more embodiments. As shown, data stream 4030 may include data objects 4510-4513. In one or more embodiments, a data object may include one or more of an email, a file, a video, an image, a banking transaction, and a record, among others. In one or more embodiments, computer system 1010 may receive data objects 4510-4513 of data stream 4030 in a serial fashion. For example, computer system 1010 may receive data objects 4510-4513 via one or more of an Internet protocol (IP), a transmission control protocol (TCP), a user datagram protocol (UDP), an Internet control message protocol (ICMP), a hypertext transport protocol (HTTP), and a simple mail transport protocol (SMTP), among others.

In one or more embodiments, computer system 1010 may be or may be included in a data plane. For example, the data plane may be or be included in a data packet routing architecture that may determine one or more actions that may be performed on and/or with data packets arriving via an one or more inbound interfaces (e.g., a network interfaces). In one instance, the data plane may determine a destination address of an incoming data packet and/or may determine a path and/or a route through a forwarding fabric to one or more outgoing interfaces (e.g., network interfaces). In another instance, the data plane may filter, augment, modify, replicate, and/or copy one or more data packets.

In one or more embodiments, computer system 1010 may receive and/or analyze data packets of data stream 4030 and determine data object 4510-4513. For example, computer system may perform one or more deep packet inspection processes and/or methods on data stream 4030. For instance, computer system 1010 may filter, augment, modify, replicate, and/or copy one or more of data object 4510-4513. In one or more embodiments, computer system 1010 may copy and/or store one or more of data object 4510-4513 via a database. In one instance, the database may be or include a relational database management system, such as an Oracle database, a Microsoft SQL Server database, a MySQL database, or a PostgreSQL database, among others. In a second instance, the database may include a graph database, such as a Neo4J database, an AllegroGraph database, an ArnagoDB database, a Cayley database, or a gStore database, among others. In another instance, the database may be or include a "not only SQL" (NoSQL) database, among others. In one or more embodiments, the database may be utilized to track object affinity attributes and/or index values, among others.

In one or more embodiments, computer system 1010 may tag one or more data objects. As illustrated, computer system 1010 may tag data objects 4510, 4511, and 4513 with respective tags 4620, 4611, and 4613. In one or more embodiments, computer system may tag one or more data object multiple times. As shown, computer system 1010 may tag data objects 4510 and 4513 with respective tags 4620 and 4623. In one or more embodiments, tags 4620, 4611, 4613, 4620, and 4623 may be stored via the database. For example, a tag may include a property and/or may be or include a relationship. For instance, the relationship may lack a pointer to another data object. In one or more embodiments, tags may permit the database to categorize data objects. For example, data objects may be retrieved by one or more categories based on one or more tags.

In one or more embodiments, two different data object may be tagged with a same tag. As illustrated, data objects 4511 and 4513 may be tagged with a tag 4710. In one example, the one or more machine learning systems, processes, and/or methods of computer system 1010 may statistically measure a strength of an affinity between or among data objects, which may allow and/or may permit one or more results to be specified within one or more confidence intervals. In one instance, data objects 4511 and 4513 may be tagged with tag 4710 as computer system 1010 may have determined statistically measure a strength of an affinity between data objects 4511 and 4513. In another instance, tag 4710 may allow and/or may permit one or more results (e.g., one or more results that may produce data objects 4511 and 4513 and/or one or more portions of data objects 4511 and 4513) to be specified within one or more confidence intervals. In another example, tag 4710 may associate data object 4511 with data object 4513. For instance, entity 4311 may include data object 4511, and tag 4710 may associated data object 4513 with entity 4311.

In one or more embodiments, one or more of tags 4620, 4611, 4613, 4620, 4623, and 4710 may indicate a legal hold. For example, tagging a data object with a tag may include flagging the data object with a legal hold. In one or more embodiments, at least one of the one or more entities 4310-312 based at least on data of data stream not satisfying one or more of rule sets 4210-212 may be utilized by one or more machine learning systems, processes, and/or methods to determine and/or develop new tags for data objects and/or for data elements.

Figure 5A:
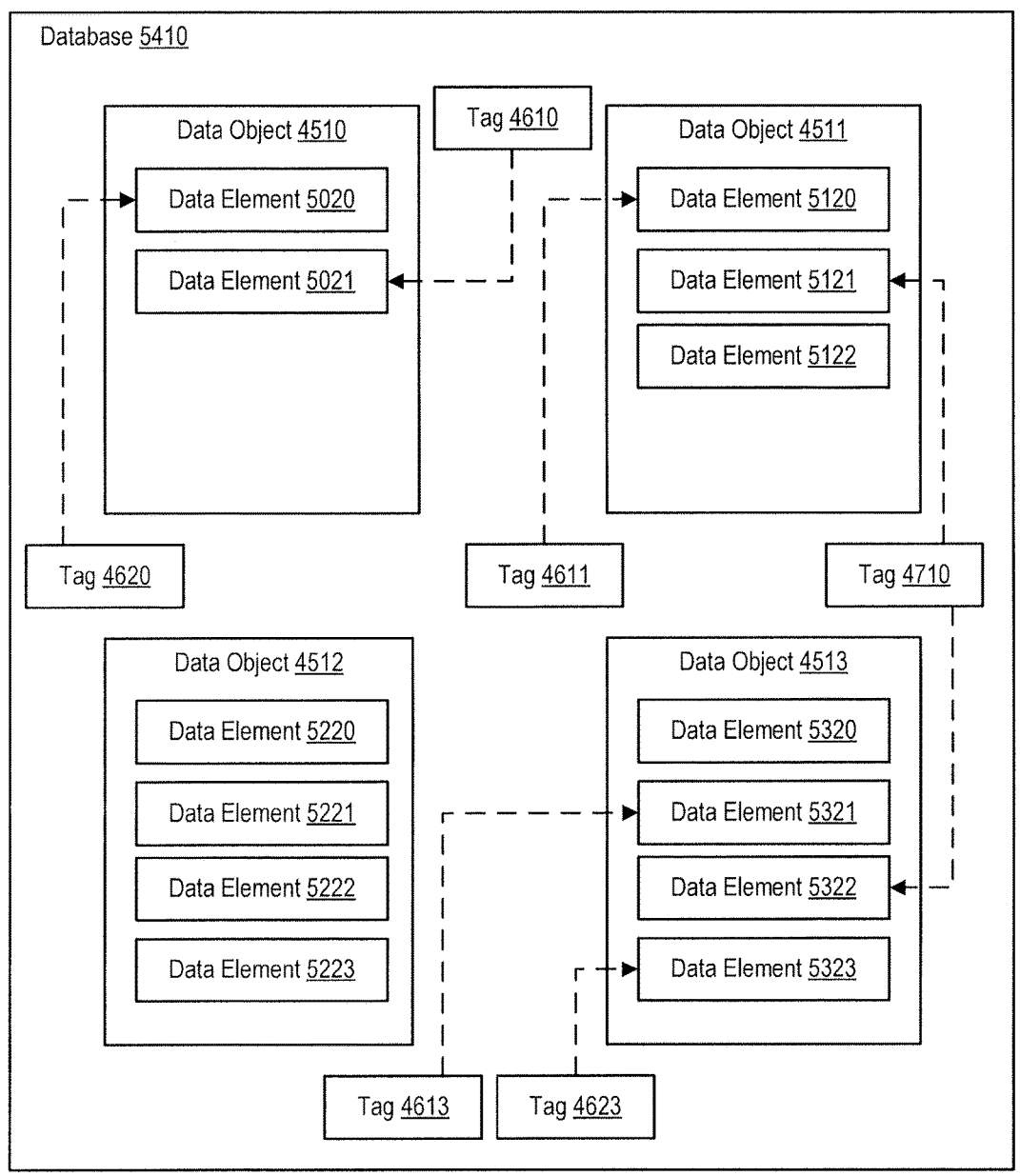
FIG. 5A illustrates an example database that stores data objects and tags, according to one or more embodiments.

Turning now to FIG. 5A, an example database that stores data objects and tags is illustrated, according to one or more embodiments. As shown, a database 5410 may store data objects 4510-4513 and tags 4620, 4611, 4613, 4620, 4623, and 4710. In one or more embodiments, database 5410 may be stored by and/or implemented via one or more of computer systems 1010A-1010H. In one or more embodiments, database 5410 may be or may include database 3030.

In one or more embodiments, a data object may include one or more data elements. In one example, a data element may be or may include an email header or a portion of an email header. For instance, a portion of an email header may include a "To" field, a "From" field, a "Subject" field, or a "Reply-To" field, among others. In a second example, a data element may be or may include a message section of an email. In a third example, a data element may be or may include an attachment section of an email. In a fourth example, a data element may be or may include a routing number of a banking transaction. In a fifth example, a data element may be or may include an account number of a banking transaction. In another example, a data element may be or may include an amount of money of a banking transaction.

In one or more embodiments, a data element may include information associated with an action. For example, the action may be or include a transfer of funds. In one instance, one or more of a routing number of a banking transaction, an account number of a banking transaction, and an amount of money of a banking transaction, among others, may be associated with one or more transfers of funds. In a second instance, one or more actions may indicate one or more money laundering actions. In another instance, one or more actions may indicate one or more intents (e.g., intents of a person, intents of an entity, etc.). In one or more embodiments, the action may satisfy one or more of rule sets 4210-4212.

As illustrated, data object 4510 may include data elements 5020 and 5021, data object 4511 may include data elements 5120-5122, data object 4512 may include data elements 5220-5223, and data object 4513 may include data elements 5320-5323. As shown, tag 4610 may be associated with data element 5021, tag 4611 may be associated with data element 5120, tag 4613 may be associated with data element 5321, tag 4620 may be associated with data element 5020, tag 4623 may be associated with data element 5323, and tag 4710 may be associated with data elements 5121 and 5322.

In one or more embodiments, database 5410 may store data objects 4510-4513 and/or tags 4620, 4611, 4613, 4620, 4623, and 4710 via a database graph. For example, database 5410 may receive a query that indicates a selection of data elements and a confidence interval. In one instance, database

5410 may search the database graph based at least on the selection of data elements and the confidence interval. In another instance, database 5410 may respond to the query with data objects that are associated with the selection of data elements and the confidence interval.

Figure 5B:
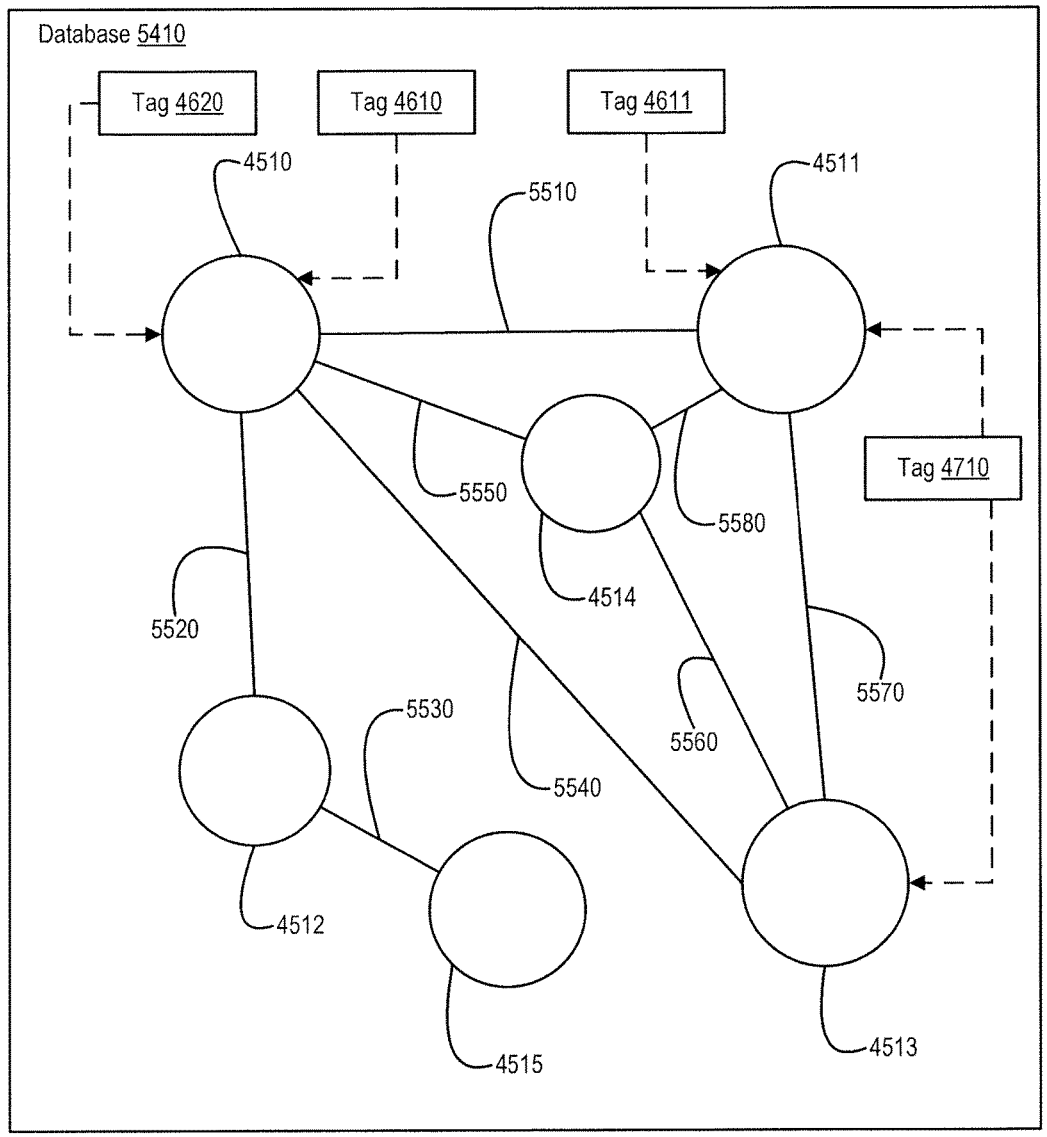
FIG. 5B illustrates an example database that stores data objects and tags via one or more graphs, according to one or more embodiments.

Turning now to FIG. 5B, an example database that stores data objects and tags via one or more graphs is illustrated, according to one or more embodiments. As shown, database 5410 may store data objects 4510-4515 and tags 4610, 4611, 4620, and 4710. In one or more embodiments, one or more systems, methods, and/or processes may utilize graph analytics. For example, the one or more systems, methods, and/or processes may utilize one or more graph structures to determine one or more relationships. In one instance, the one or more graph structures may model pair-wise relationships between objects. In another instance, the one or more graph structures may be utilized in determining one or more strengths and/or directions of a relationship. In one or more embodiments, a strength of a relationship may include a measure of a type of node of a graph based on performing an analysis.

In one or more embodiments, database 5410 may be or include a graph database. For example, a graph database may utilize one or more graph structures that may include nodes, edges, and properties to represent and store data. For instance, the graph database may utilize one or more graph structures for semantic queries. In one or more embodiments, a semantic query may permit analytics of associative and/or contextual nature. In one example, a semantic query may permit and/or enable retrieval explicitly and/or implicitly derived information. For instance, the explicitly and/or implicitly derived information may be based on one or more of syntactic information, semantic information, and structural information of data. In a second example, a semantic query may produce and/or provide precise results. In a third example, a semantic query may produce and/or provide results to a query via pattern matching and/or digital reasoning (e.g., machine learning, artificial intelligence, etc.). For instance, a semantic query may produce and/or provide results associated with "fuzzy" and/or open questions. In another example, a semantic query may infer results from graph data via processing actual relationships between data.

As illustrated, nodes may be or include data objects 4510-4515. As shown, data objects 4510-4515 may be related via edges 5510-5580. In one or more embodiments, one or more systems, processes, and/or method may determine one or more of edges 5510-5580. In one example, the one or more systems, processes, and/or method may determine edge 5520. In one instance, data objects 4510 and 4512 may be emails addressed to a same email account, and edge 5520 may represent a relationship that includes that same email account. In another instance, data objects 4512 and 4515 may be emails addressed to the same email account, and edge 5530 may represent a relationship that includes that same email account. In one or more embodiments, data objects 4512 and 4515 may be associated with tag 4620 via edges 5520 and 5530. For example, tag 4620 may be associated with a legal hold. For instance, data objects 4512 and 4515 may be associated with and/or subject to the legal hold via their association with tag 4620.

In one or more embodiments, a scale and capabilities may enable business processes to evolve beyond the "one to one" or "one to many" relationships to a full scale graph analytics built and maintained by one or more machine learning systems, method, and/or processes that may continuously process data and/or organize "many to many" relationships with corresponding degrees of correlation. In one example, indirect relationships and measures of their strength may provide an amount of business value. For instance, data object 4515 may be indirectly related to data object 4510 via data object 4512 and edges 5520 and 5530. In another example, the one or more machine learning systems, method, and/or processes that may continuously process data and/or organize "many to many" relationships with corresponding degrees of correlation may determine one or more patterns of group communications within the myriad of data. In one instance, one or more patterns of relationships may be determined via text messages, emails, social media, and/or call detail records, among others. In another example, one or more patterns of relationships may be determined via a path analysis, which may be utilized in determining relationships and/or connections between one or more pairs of entities, which may be useful in determining one or more risks and/or exposures.

In one or more embodiments, a company may be involved in litigation and/or some other legal proceeding. For example, an ability to associate and properly maintain an accurate and complete litigation hold may be a foundation for electronic data preservation. For instance, one or more organizations that may not be able to process and/or produce discoverable material may endanger their entire litigation portfolios.

Figure 6:
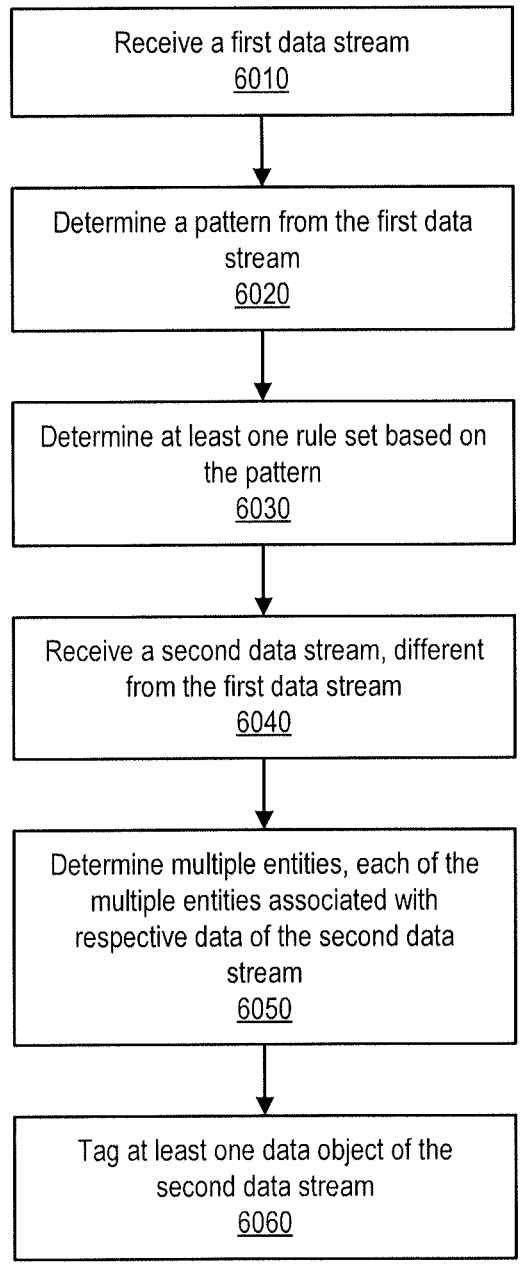
FIG. 6 illustrates a method tagging a data objects, according to one or more embodiments.

Turning now to FIG. 6, a method of tagging a data objects is illustrated, according to one or more embodiments. At 6010, a first data stream may be received. For example, computer system 1010 may receive data stream 4020. In one or more embodiments, data stream 4020 may be or include seed data, which may be classified and/or tagged, based on one or more classifications, and may be provided to one or more machine learning systems, processes, and/or methods. For example, computer system 1010 may include the one or more machine learning systems, processes, and/or methods, which may utilize the seed data and/or tags within a graph system to determine additional relationships between or among elements and/or to extend a data graph (e.g., a database) by constructing new tag attributes to capture the additional relationships.

At 6020, a pattern from the first data stream may be determined. For example, computer system 1010 may determine pattern 4110 from data stream 4020. In one instance, computer system 1010 may determine pattern 4110 to be or include a pattern of use. In another instance, computer system 1010 may determine pattern 4110 to be or include a pattern of words that indicates at least one intent. At 6030, at least one rule set based at least on the pattern may be determined. For example, computer system 1010 may determine one or more of rule sets 4210-4212.

At 6040, a second data stream, different from the first data stream, may be received. For example, computer system 1010 may receive data stream 4030. At 6050, multiple entities, each of the multiple entities associated with respective data of the second data stream that satisfies the at least one rule set, may be determined. In one or more embodiments, each of the multiple entities may include a data object. For example, computer system 1010 may determine multiple entities 4310-4312. In one instance, each of the multiple entities 4310-4312 may include a data object. In another instance, determining entities 4310-4312 may include determining that entities 4310-4312 satisfy one or more of rule sets 4210-4212.

At 6060, at least one data object of the second data stream may be tagged. For example, computer system 1010 may tag one or more of data objects 4510, 4511, and 4513. In one or more embodiments, method element 6060 may be performed in response to determining the multiple entities. For example, computer system may tag one or more of data objects 4510, 4511, and 4513 in response to determining entities 4310-4312.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
   a processor; and
   a memory medium communicatively coupled to the processor;
   wherein the memory medium stores instructions that are executable by the processor and that when executed by the processor, cause the system to:
      receive a first data stream;
      determine a pattern from the first data stream;
      determine at least one rule set based at least on the pattern;
      receive a second data stream, different from the first data stream;
      determine a plurality of entities, each of the plurality of entities associated with respective data of the second data stream that satisfies the at least one rule set; and
      in response to determining the plurality of entities, tag at least one data object of the second data stream.

2. The system of claim 1, wherein the memory medium further stores instructions that are executable by the processor and that when executed by the processor, cause the system to further:
   in response to determining the plurality of entities, provide an alert.

3. The system of claim 1,
   wherein the at least one data object includes information associated with at least one action; and
   wherein the at least one action that satisfies the at least one rule set.

4. The system of claim 3, wherein the at least one action indicates at least one money laundering action.

5. The system of claim 1, wherein to tag the at least one data object of the second data stream associates the at least one data object with at least one of the plurality of entities.

6. The system of claim 1, wherein to tag the at least one data object, the memory medium further stores instructions that are executable by the processor and that when executed by the processor, cause the system to further flag the at least one data object with a legal hold.

7. The system of claim 1, wherein the memory medium further stores instructions that are executable by the processor and that when executed by the processor, cause the system to further:
   store a first plurality of data objects, that includes the at least one data object, via a database graph;
   receive a query that indicates a selection of data elements and a confidence interval;
   search the database graph based at least on the selection of data elements and the confidence interval; and
   respond to the query with a second plurality of data objects that are associated with the selection of data elements and the confidence interval.

8. A method, comprising:
   receiving a first data stream;
   determining a pattern from the first data stream;
   determining at least one rule set based at least on the pattern;
   receiving a second data stream, different from the first data stream;
   determining a plurality of entities, each of the plurality of entities associated with respective data of the second data stream that satisfies the at least one rule set; and
   in response to the determining the plurality of entities, tagging at least one data object of the second data stream.

9. The method of claim 8, further comprising:
   in response to the determining the plurality of entities, providing an alert.

10. The method of claim 8,
    wherein the at least one data object includes information associated with at least one action; and
    wherein the at least one action that satisfies the at least one rule set.

11. The method of claim 10, wherein the at least one action indicates at least one money laundering action.

12. The method of claim 8, wherein the tagging the at least one data object associates the at least one data object with at least one of the plurality of entities.

13. The method of claim 8, wherein the tagging the at least one data object includes flagging the at least one data object with a legal hold.

14. The method of claim 8, further comprising:
    storing a first plurality of data objects, that includes the at least one data object, via a database graph;
    receiving a query that indicates a selection of data elements and a confidence interval;
    searching the database graph based at least on the selection of data elements and the confidence interval; and
    responding to the query with a second plurality of data objects that are associated with the selection of data elements and the confidence interval.

15. A computer-readable non-transient memory medium that comprises instructions executable by a processor of a system, wherein when the processor executes the instructions, the instruction cause the system to:
    receive a first data stream;
    determine a pattern from the first data stream;
    determine at least one rule set based at least on the pattern;
    receive a second data stream, different from the first data stream;

determine a plurality of entities, each of the plurality of entities associated with respective data of the second data stream that satisfies the at least one rule set; and in response to determining the plurality of entities, tag at least one data object of the second data stream.

16. The computer-readable non-transient memory medium of claim 15, wherein the memory medium further stores instructions that are executable by the processor and that when executed by the processor, cause the system to further:

in response to determining the plurality of entities, provide an alert.

17. The computer-readable non-transient memory medium of claim 15, wherein the at least one data object includes information associated with at least one action; and wherein the at least one action that satisfies the at least one rule set.

18. The computer-readable non-transient memory medium of claim 17, wherein the at least one action indicates at least one money laundering action.

19. The computer-readable non-transient memory medium of claim 15, wherein to tag the at least one data object, the memory medium further stores instructions that are executable by the processor and that when executed by the processor, cause the system to further flag the at least one data object with a legal hold.

20. The computer-readable non-transient memory medium of claim 15, wherein the memory medium further stores instructions that are executable by the processor and that when executed by the processor, cause the system to further:

store a first plurality of data objects, that includes the at least one data object, via a database graph;

receive a query that indicates a selection of data elements and a confidence interval;

search the database graph based at least on the selection of data elements and the confidence interval; and respond to the query with a second plurality of data objects that are associated with the selection of data elements and the confidence interval.

\* \* \* \* \*